W. DAVIS & J. JOHNSON.
FISH HOOK.
No. 51,651.                                Patented Dec. 19, 1865.
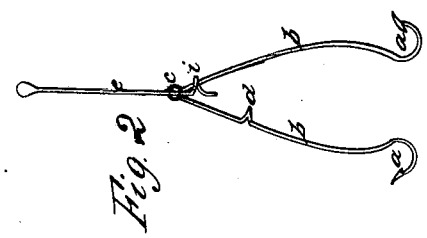
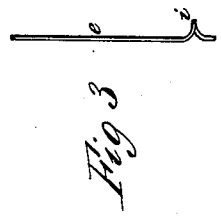
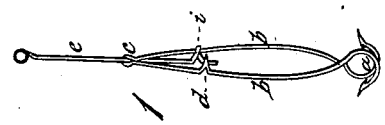
Witnesses;
Lemuel W. Serrell
Geo. D. Walker
Inventor;
William Davis
Jobe Johnson ns.
UNITED STATES PATENT OFFICE.

WM. DAVIS AND JOB JOHNSON, OF BROOKLYN, NEW YORK, ASSIGNORS TO JOB JOHNSON, OF SAME PLACE.

IMPROVEMENT IN FISH-HOOKS.

Specification forming part of Letters Patent No. 51,651, dated December 19, 1865.

*To all whom it may concern:*

Be it known that we, WILLIAM DAVIS and JOB JOHNSON, of Brooklyn, in the county of Kings and State of New York, have invented, made, and applied to use a certain new and useful Improvement in Fish-Hooks, which we term the "Lincoln Trout-Hook;" and we do hereby declare the following to be a full, clear, and exact description of the same, reference being had to the annexed drawings, making part of this specification, wherein—

Figure 1 represents the nook as closed ready for use. Fig. 2 represents the hook as open in the position it will assume when catching in the fish's mouth, and Fig. 3 is a view of the fish-hook shank separately.

Similar marks of reference denote the same parts.

Spring or snap fish-hooks have been made in a variety of forms and held by a bolt or slide, as may be seen by reference to Letters Patent granted March 20, 1849, to Job Johnson. Spring-hooks have also been made with a coil of wire at the junction of the shanks of the two hooks and with eyes twisted in the shanks themselves. There is, however, difficulty in manufacturing these hooks so that the said eyes bent in the shanks will come correctly against each other, and in the tempering of said hooks it is difficult to operate on the separate bolt so as to bring that to the proper heat, because the bolt has to be attached to the hook before the hook is tempered, and this condition of the manufacture also prevents the bolt being replaced if bent or injured.

The nature of our said invention consists in a fish-hook shank having an eye sliding on one of the shanks of the hook and a point or bolt entering an eye turned in the shank of the other hook, so as to hold said hooks together when baited, said sliding shank passing through an eye at the junction of the hook. By this construction the parts can be made separately and put together by sliding the eye of the shank back over the point of the hook and entering the upper end of the said shank through the eye at the junction of the shanks of the hooks, the line being attached to said sliding shank.

In the drawings, $a\ a$ are the hooks; $b\ b$, their shanks, bent to form an eye, $c$, at the apex or point where the hooks come together. $d$ is an eye turned in the wire of one of the shanks $b$. $e$ is the sliding fish-hook shank, passing through the eye $c$, and having an eye turned in its lower portion, at $i$, which passes around the plain shank $b$, and the point of $e$ enters the eye $d$, to hold the hooks together in the position shown in Fig. 1. If the upper end of the shank $e$ is simply spread, as in Fig. 2, or roughened, as in Fig. 3, the line can be securely attached at this point, and the shank $e$ can, when the line is not attached, be slipped through the eye $c$ and disconnected. If preferred, however, the upper end of $e$ may be left soft, so that an eye can be turned in the same, as seen in Fig. 1, after the parts of the hook have been put together.

What we claim, and desire to secure by Letters Patent, is—

The shank $e$, formed with an eye sliding upon one of the fish-hook shanks $b$, in combination with the eye $d$, turned in the other fish-hook shank, as and for the purposes specified.

Dated this 28th day of October, 1865.

WILLIAM DAVIS.
JOB JOHNSON.

Witnesses:
LEMUEL W. SERRELL,
GEO. D. WALKER.